April 9, 1968 A. R. BRAULT 3,377,111
PRECISION COORDINATE AXES TABLE MEANS
Filed Feb. 15, 1966 7 Sheets-Sheet 1

INVENTOR.
ANDRE R. BRAULT
BY
*James P. Malone*

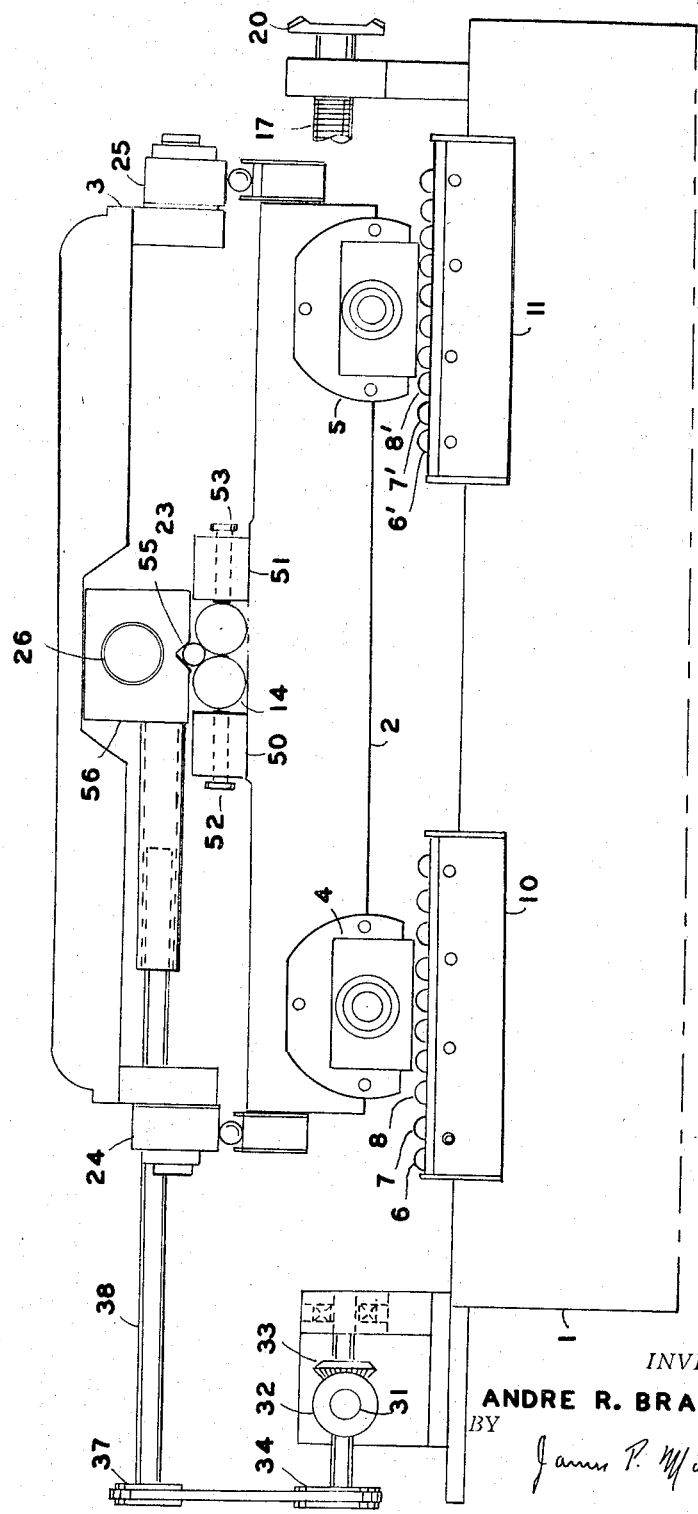

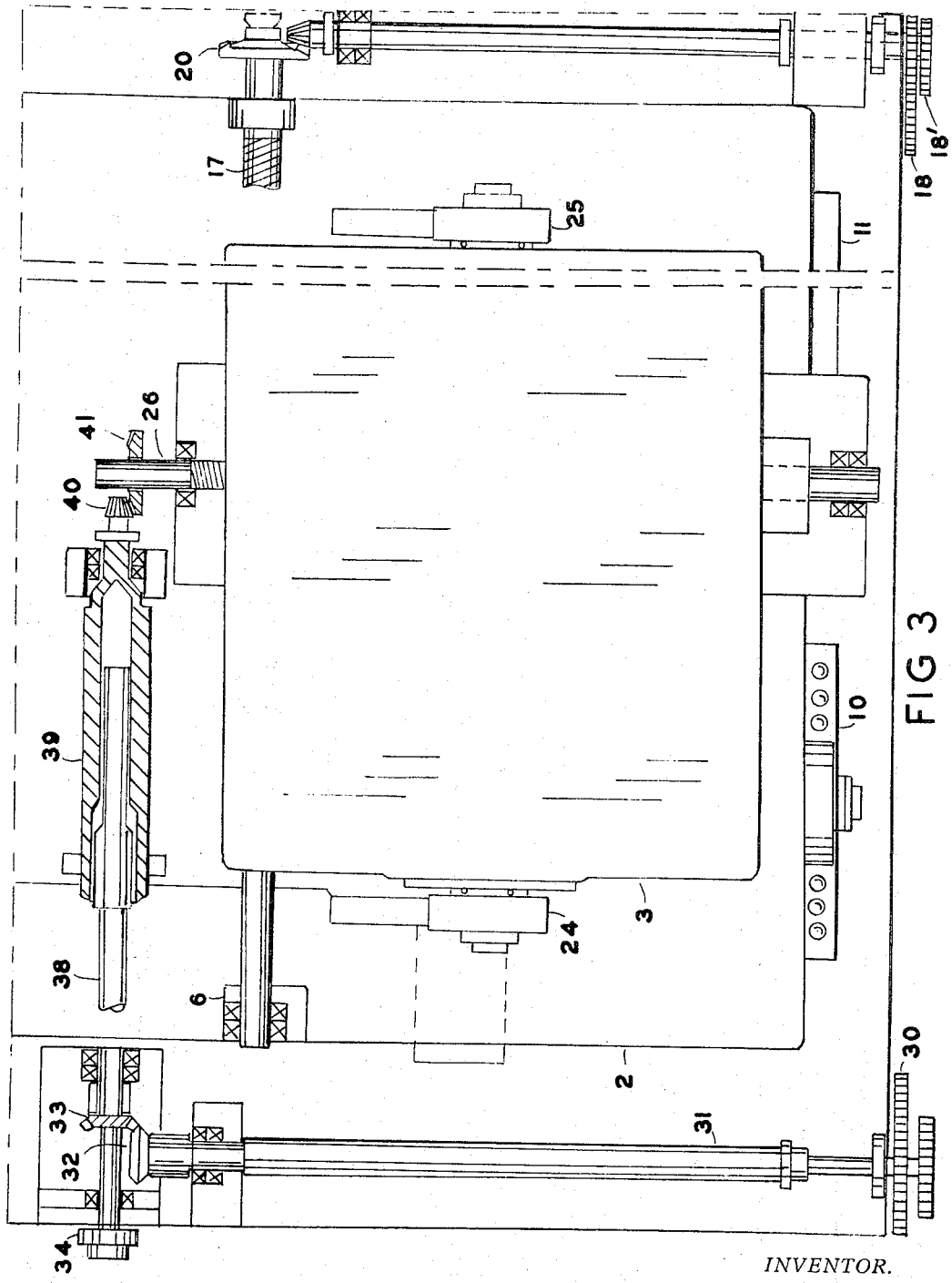

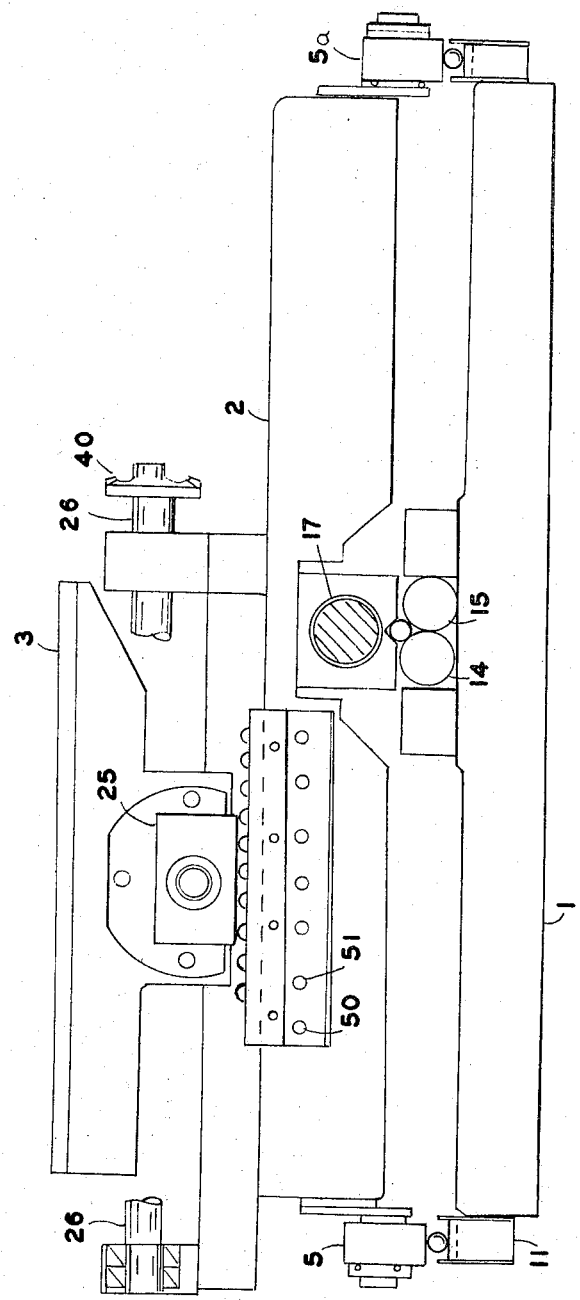

April 9, 1968     A. R. BRAULT     3,377,111
PRECISION COORDINATE AXES TABLE MEANS
Filed Feb. 15, 1966     7 Sheets-Sheet 5
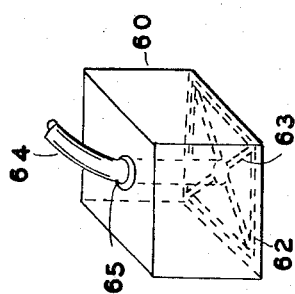
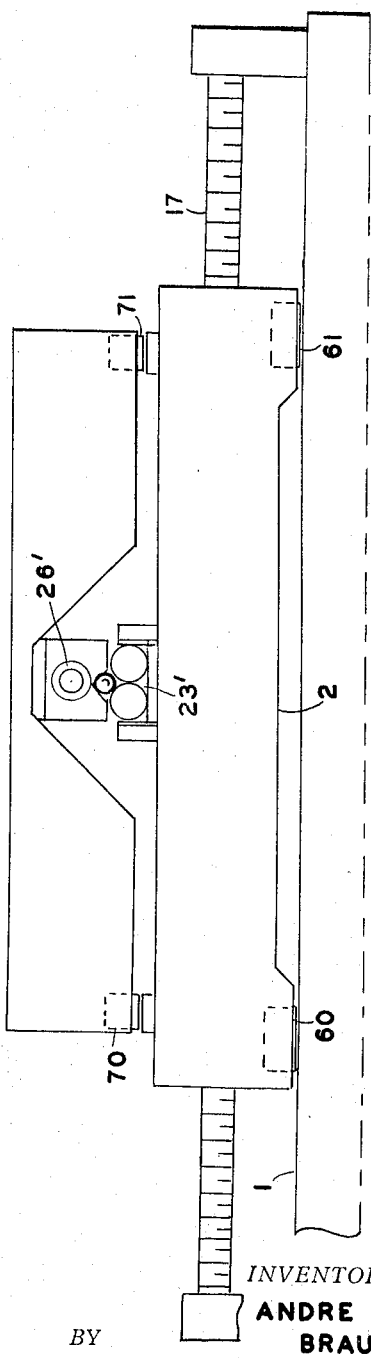
INVENTOR.
ANDRE R. BRAULT
BY James P. Malone

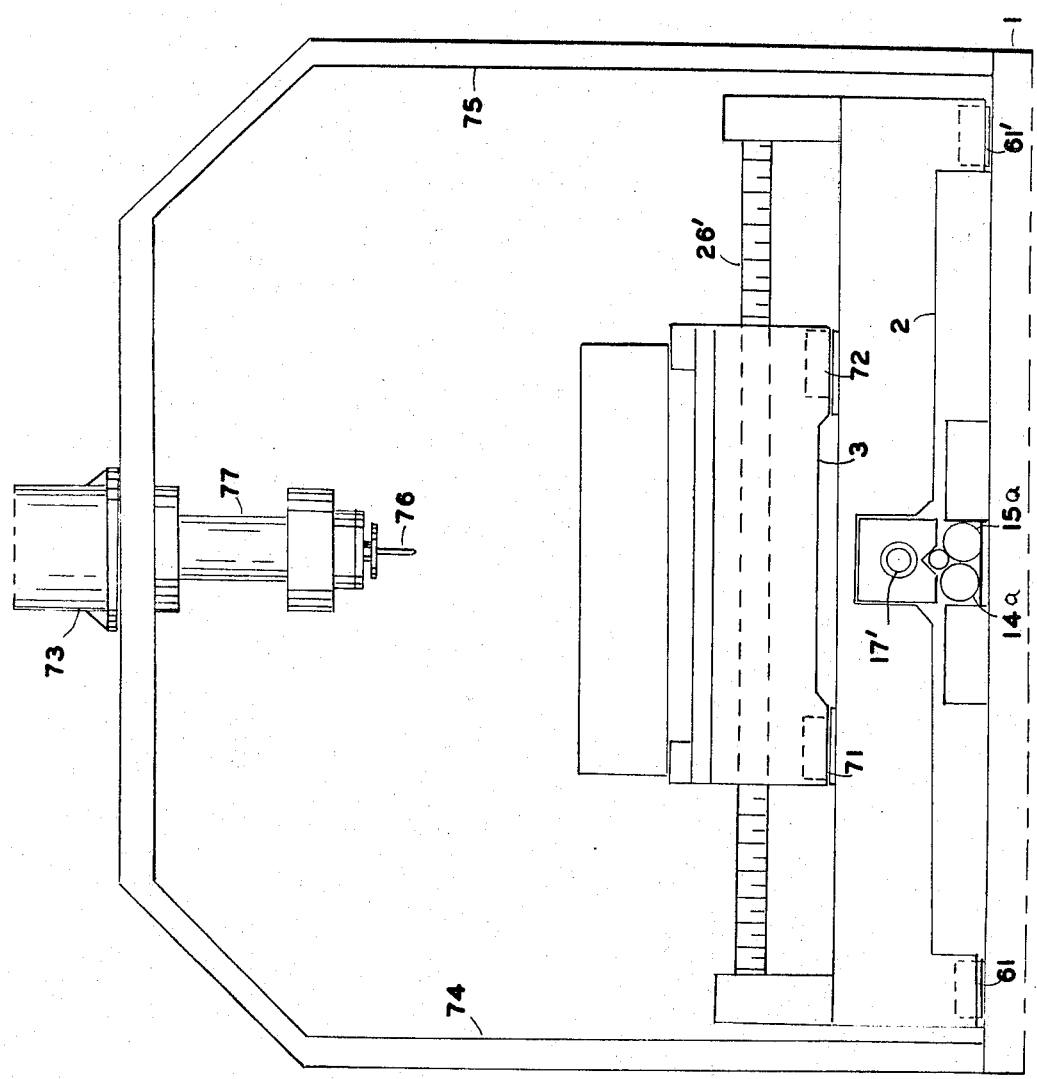

April 9, 1968  A. R. BRAULT  3,377,111
PRECISION COORDINATE AXES TABLE MEANS
Filed Feb. 15, 1966  7 Sheets-Sheet

INVENTOR.
ANDRE R. BRAULT
BY

| United States Patent Office | 3,377,111 |
|---|---|
| | Patented Apr. 9, 1968 |

3,377,111
PRECISION COORDINATE AXES TABLE MEANS
Andre R. Brault, North Merrick, N.Y., assignor to OPTOmechanisms, Inc., Plainview, N.Y.
Filed Feb. 15, 1966, Ser. No. 527,554
3 Claims. (Cl. 308—3)

ABSTRACT OF THE DISCLOSURE

Coordinate axes positioning apparatus having a frame, a first carriage movable along a first axes on said frame and a second carriage mounted on said first carriage and movable along the coordinate axes to said first axes wherein said carriages are mounted on precision ways for perfect alignment and on ball bearing mounted blocks which are supported by a row of balls.

---

This invention relates to table or platform means for moving an article along two coordinate axes with ultra precision motion.

More specifically the present invention is a high precision measuring instrument. For instance, it may be used for the purpose of stereomicroscope observation and photo interpretation of a set of compatible film chips, for accurate hole location on a work piece, or for gauging and measurement. It simultaneously positions the X and Y coordinates of any points on the film plane with respect to a chosen reference point with respectable accuracy of better than .000010".

The position of the object to be viewed is measured along the two axes by interferometers and the output may be fed to counters or computers or other utilization means which are outside the scope of the present invention. The present invention is directed primarily to the mechanical arrangement which provides the repeatable precision movement along the two axes.

The major problems in moving the tables or carriages mechanically are the preserving of perfect alignment along the axes and providing for minimum friction. In the present invention the alignment is provided by precision ways made in accordance with my Patent No. 3,076,682, granted Feb. 5, 1963, entitled: Precision Ways. The minimum friction is provided by rotatably mounted bearing blocks which are mounted at the sides of the carriage by ball bearings. The bearing blocks have extremely flat bottom surfaces which ride on a row of ball bearings contained in suitable holders on the supporting structure. With this combination the precision of the alignment is maintained by the precision ways and the weight is supported at the ball bearing blocks. Any wear of the ball bearings is averaged in use since the ball bearings are constantly turning in this arrangement. No lubrication is needed or used since the application of oil causes sticking or stiction which interferes with precise movement.

Accordingly, a principal object of the invention is to provide new and improved precision coordinate axes platform means.

Another object of the invention is to provide new and improved carriage means for locating an object to be viewed very accurately along two coordinate axes.

Another object of the invention is to provide new and improved movable table means comprising bearing block means to support the weight and precision way means to provide alignment and guidance.

Another object of the invention is to provide new and improved coordinate axes positioning means comprising a frame, a first carriage movable along a first axes on said frame and a second carriage mounted on said first carriage and movable along the coordinate axes to said first axes.

Another object of the invention is to provide new and improved coordinate axes positioning means comprising a frame, a first carriage movable along a first axes on said frame and a second carriage mounted on said first carriage and movable along the coordinate axes to said first axes with a minimum of friction and with adjustable precise orthogonality.

Another object of the invention is to provide new and improved coordinate axes positioning means comprising a frame, a first carriage movable along a first axes on said frame and a second carriage mounted on said first carriage and movable along the coordinate axes to said first axes wherein said carriages are mounted on precision ways for perfect alignment and ball bearing mounted blocks which are supported by a row of balls.

Another object of the invention is to provide new and improved precision coordinate axes platform means comprising a frame, a first carriage, first means to mount said first carriage for precision movement along a first axis on said frame, second means to mount said second carriage for precision movement on said first carriage along second axis perpendicular to said first axis, said first mounting means comprising, precision way means located at the center of said frame and first carriage and rotatable bearing block means mounted at each side of said carriage and said frame and similar means for mounting the second carriage on the first carriage.

Another object of the invention is to provide new and improved coordinate axes positioning means for use with utilization apparatus such as vertically movable probes for inspection and/or marking of precision machine parts or scribing of precise reticles, calibration of scales and reticles and use of photo flash optical systems for fabrication of micro circuitry and masks or transistors.

These and other objects of the invention will be apparent from the following specification and drawings of which:

FIGURE 2 is a front view of an embodiment of the invention.

FIGURE 3 is a top view of the embodiment of FIGURE 2.

FIGURE 4 is a side view of the embodiment of FIGURE 2.

FIGURE 5 shows a front view of a modification of the invention.

FIGURE 5A is a detail view of an air bearing block.

FIGURE 6 shows a side view of the embodiment of FIGURE 5.

Figure 1:
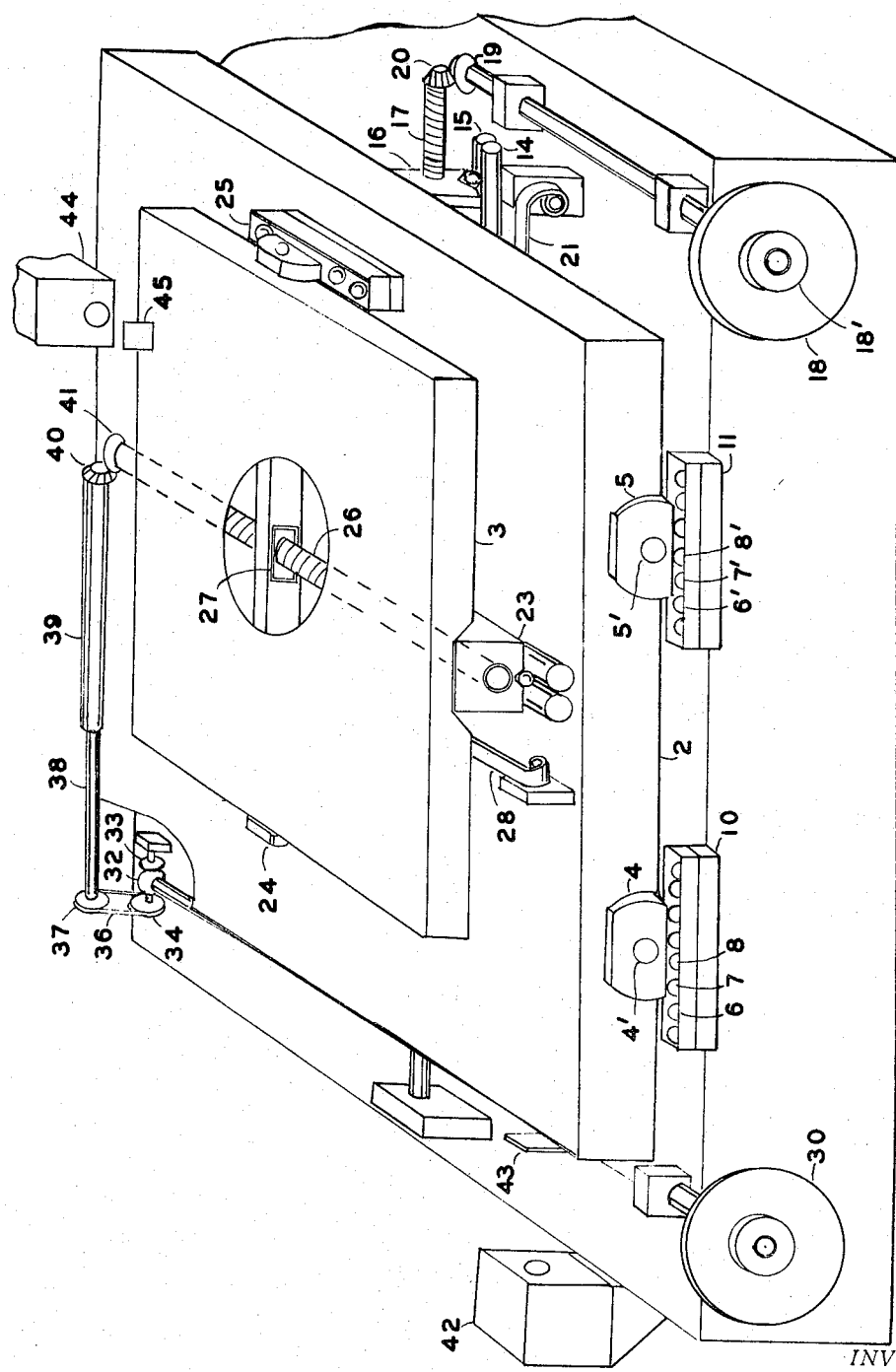
FIGURE 1 is a schematic view of one embodiment of the invention.

Referring to the figures, FIGURE 1 shows a schematic perspective view of the embodiment of the invention, which generally comprises a frame member 1 which is a very stable supporting member which has a leveling adjustment and a first carriage 2 and a second carriage 3. The first carriage 2 is adapted to be moved along the major axes of the table and the second carriage 3 is mounted on the first carriage and is adapted to be moved along the coordinate axis.

The first carriage 2 is mounted by means of a plurality of rotatably mounted blocks 4 and 5 with a corresponding block or blocks on the other side. The ball bearing blocks 4 and 5, etc. are rotatably mounted to the first carriage by means of ball bearings 4', 5', etc. The blocks are adapted to ride on a row of plurality of balls 6, 7, 6', 7', 8, 8', etc. which are mounted in carriers 10 and 11 which are mounted on the main frame.

This arrangement provides minimum starting friction. The rotatable mounting of the blocks provides self leveling and integrates the minute errors in the precision balls while maintaining the table level.

The bottom surfaces of the blocks which ride on the balls are made to optical flatness and the balls are of the highest grade. However, the relative motion of the blocks and balls tends to average out any slight mechanical discrepancies that may occur. These blocks and balls provide a very low friction to stiction ratio device for supporting the weight of the carriage. However, they do not provide any guidance.

The alignment guidance is provided by means of precision ways which generally comprises a pair of rods 14 and 15 which are mounted on the frame with suitable mounting means which include adjustable means for preserving the straightness of the rods. The details of the precision way mounting means are discussed in my prior Patent No. 3,076,682, granted Feb. 5, 1963, entitled: Precision Ways. The carriages are supported on the precision ways by means of a block 16 fixedly mounted to the carriage 2, the block having an inverted V-cut. A plurality of bearing balls are mounted on the precision ways and the inverted V-cut block is mounted on the balls. This arrangement provides a very accurate means of controlling the linear motion which also has very low friction.

The bearing block means are designed and adjusted to carry the weight and there is no stress or strain on the precision ways which would affect this alignment.

The amount of motion along one axis is controlled by a lead screw 17 which is adapted to be rotated by the means of the hand wheel 18 via the gears 19 and 20. The lead screw 17 is a precision lead screw and the hand wheel has a large hand wheel 18 for making larger movements and a small wheel 18' for making more precise movement along the axis of motion. The precision lead screw engages a nut which is fixedly connected to the carriage 3 and its center of gravity for instance, it may be incorporated in the V-cut block. The nut is fixed with respect to X–Y horizontal motion but preferably has some freedom along the vertical axis. In order to eliminate any backlash between the nut and the precision lead screw, there is a spring connection between the carriage and the main frame. This comprises the spring 21 which connects the main frame of the carriage. This spring is preferably of the constant torque type such as the "Nagator" type.

The upper carriage 3 is mounted on the carriage 2 for movement along the coordinate axis in the same manner as the lower carriage is mounted. The upper carriage 3 is mounted in the lower carriage 2 by means of the precision ways 23, which are identical to those previously described and by means of the rotatably mounted bearing blocks 24, 25, which are identical to those previously described.

The motion of the upper carriage is made by means of the lead screw 26 which connects with the nut 27 fixedly connected to the upper carriage 3 with respect to X and Y axes horizontal motion. The upper carriage is connected to the lower carriage by means of the spring 28 in order to eliminate backlash between the precision lead screw 26 and nut 27.

Motion of the lead screw 26 is controlled by the hand wheel 30 by means of the shaft 31, gears 32, 33, and pulley 34, belt or chain 36, pulley 37, and splined shafts 38 and 39. The shaft 39 is connected to the lead screw 26 by gears 40 and 41. Note that the shafts 38 and 39 are splined shafts telescoping in order to accommodate the movement of the upper carriage 3.

The motion of the first carriage is adapted to be read very accurately by means of the interferometric sensor 42 or optical scales or other electronic readout systems may be used which operates with a mirror 43 mounted on the first carriage 2. The motion of the carriage 3 along the other axis is measured by means of the interferometric sensor 44 or optical scales or other electronic readout systems may be used which is mounted on the carriage 2 which cooperates with a mirror or other reflector 45 mounted on the carriage 3.

This schematic view shows a basically identical drive for both tables or carriages. These drives are provided with dual ratios, operated by co-axially located hand wheels. In a typical embodiment, the lead screws have a lead of 1 mm. per turn. The outer, or slewing hand wheel will transport its respective table 2.4 mm. per revolution, requiring 45 turns to transport it over 4¼ inches. This is equivalent to 6.67 microns per degree of turn. The inner or fine hand wheel will transport the same table 0.1 mm. per revolution, requiring 1,080 turns to transport it over 4¼ inches. This is the equivalent to .028 micron per degree of turn. The X and Y tables are preloaded against each other, while the X table is preloaded against the base both by Nagator constant force type springs to remove possible backlash between lead screws and lead nuts.

FIGURE 2 shows a front view of the embodiment of the invention showing the main frame 1, first carriage 2, and upper carriage 3. The first carriage 2 is adapted to be supported by means of the bearing blocks 4 and 5 which ride on the balls 6, 7, 8, 6', 7', and 8' which are held in the ball racks 10 and 11.

The upper carriage 3 rides on the rotatably mounted ball bearing blocks 24 and 25 and is guided by means of the precision ways 23. The precision ways as described in my above mentioned patent comprise a pair of perfectly rounded rods 14' and 15' which extend the length of the maximum movement of carriage 3. The rods are mounted in supporting blocks 50 and 51 which have suitable adjustments 52 and 53 which are spaced along the blocks 50 and 51 in order to insure perfect alignment of the rods 14' and 15' as described more fully in my aforementioned patent. On top of the rods 14' and 15' are mounted a plurality of balls 55.

On top of the balls is mounted an inverted V-block 56 which is fixedly connected to the carriage 3. The V-block 56 is hollow and accommodates the lead screw 26. The lead screw engages a nut fixedly mounted in the carriage 3. The lead screw 26 is operated by means of the gears 40 and 41 as shown in FIGURE 1, which are connected to the spline shafts 38 and 39. The shaft 38 is splined to hollow shaft 39 and telescopes within it in order to accommodate movement of the upper carriage 3.

At the left hand end of the shaft 38 is connected a pulley 37 which is belted to another pulley 34 which is geared by means of gears 32 and 33, to the hand wheel shaft 31 for the purpose of controlling the movement of the carriage.

The motion of the carriage 2 is controlled by a similarly mounted lead screw 17 which is connected by means of the gear 20 to the other hand wheel 18 as shown in FIGURE 1.

FIGURES 3 and 4 illustrate top and side views of FIGURE 2. FIGURE 3 illustrates the spline shaft arrangement 38 and 39 which is adapted to energize the lead screw 26 by means of the hand wheel 30 and shaft 31. FIGURE 3 also illustrates the gearing to the lead screw 17 comprising gears 19 and 20 which are connected to the hand wheel 18. The side ball holders are adjustable in height by means of mounting screws 50, 51, etc., to provide perfect level for the carriages.

FIGURE 4 is a side view which illustrates the lead screw 17 and the precision ways 14 and 15 in an end view. This figure also shows the upper carriage 3 supported by the bearing block 25 and the lower carriage 2 supported by the bearing blocks 5 and 5a.

FIGURES 5 and 6 show a modification of the invention wherein the bearing blocks, which ride on the balls, are eliminated and are replaced by air bearings. In FIGURE 5 the platform 2 rides on air bearing blocks 60, 61, 61' and a corresponding block on the rear corner which is not shown on the platform 2.

An air bearing block is illustrated in FIGURE 5A and comprises an enclosure block 60 which has a plurality of slots 62, 63 on the bottom surface. A source of air pressure for instance, 8 to 20 lbs. per square inch is connected to the tubing 64 and to the fitting 65 which is connected in the top of the block. The fitting 65 is connected internally to the slots 62 and 63. The air bearing blocks may be an integral part of the platform 2. The motion of the air bearing blocks is provided by the lead screw 17' in the same manner as disclosed in the previous embodiment and the guidance is provided by precision ways 14a and 15a shown in FIGURE 6.

The table 3 is similarly mounted on the table 2 with air bearing blocks 70, 71, 72 and is driven by the lead screw 26'. The platform is aligned by the means of precision ways 23'.

The advantage of the air bearings modification is that the air bearings may be manufactured more economically than the ball bearing device and they provide an almost negligible friction.

Figure 7:
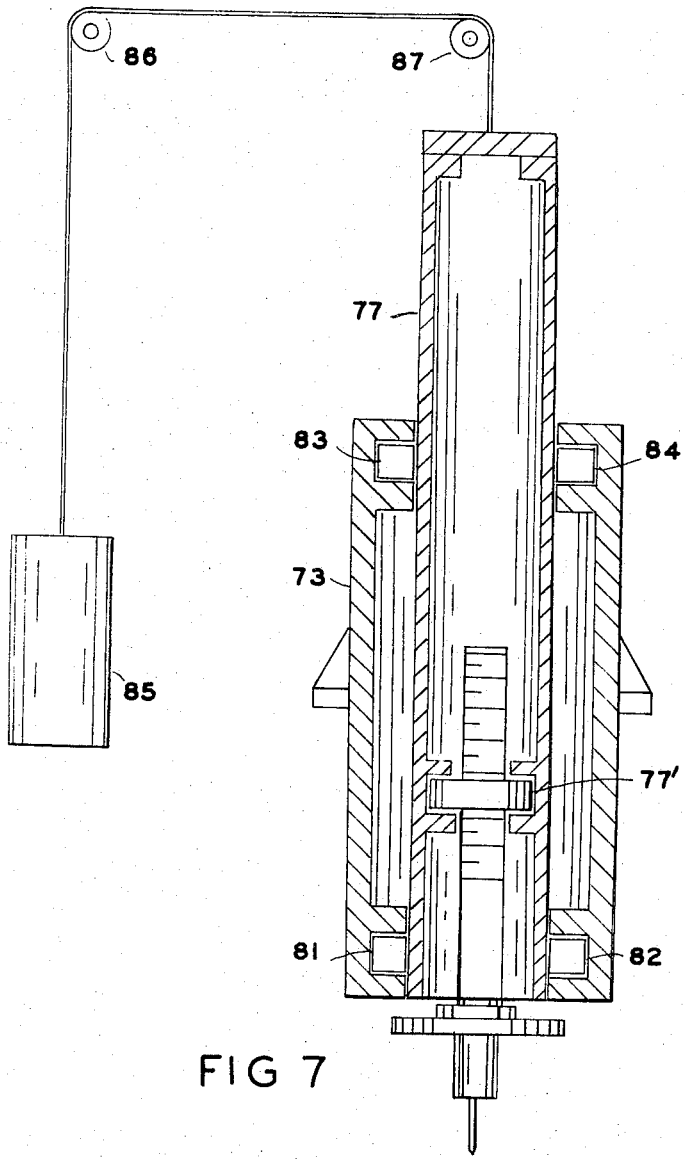
FIGURE 7 shows a detail view of the probe member of FIGURE 6.

Referring specifically to FIGURES 6 and 7, they disclose specific utilization apparatus which may be a marking probe 73 which is mounted on brackets 74, 75 connected to the frame 1. The probe 73 may be a shaft or piston type device as illustrated in FIGURE 7 with a quill or pen 76 at the end of the shaft 77.

In order to secure accurate alignment, the piston or shaft rides inside the air bearings 81, 82, 83 and 84. The air gap of the air bearings are of the order of .0005 inch. The piston member is preferably made quite heavy for stability and accuracy and is preferably counter-weighted by means of the weight 85, which is suspended on the pulleys 86, 87, which are mounted on the frame 1. The quill may be adjusted by threaded nut 77' and the threaded shaft 76'.

Other equivalent utilization apparatus may be used for instance, a drill head for drilling holes or means for marking film or drawings, a photo flash attachment for micro-circuitry or diamond engraving styles for scales or reticles.

Many modifications may be made by those who desire to practice the invention without departing from the scope thereof which is defined by the following claims.

I claim:
1. Precision coordinate axes platform means comprising,
a frame,
a first carriage, a second carriage,
first means to mount said first carriage for precision movement along a first axis on said frame,
second means to mount said second carriage for precision movement on said first carriage along second axis perpendicular to said first axis,
said first mounting means comprising,
precision way means located at the center of said frame and first carriage and ball bearing block means mounted at each side of said first carriage and said frame,
said ball bearing block means comprising an upper block and a lower box containing a plurality of balls said ball bearing block means being adapted to carry substantially all the weight to thereby minimize distorting weight being placed on said precision way means.

2. Apparatus as in claim 1 wherein said precision way mounting means for said first carriage comprises,
a set of precision ways mounted on said frame parallel to said first motion axis,
a plurality of bearing balls mounted in said precision ways,
a block having an inverted V-portion mounted on said first carriage,
said inverted V-portion riding on said balls.

3. Precision coordinate axes platform means comprising,
a frame,
a first carriage, a second carriage,
first means to mount said first carriage for precision movement along a first axis on said frame,
second means to mount said second carriage for precision movement on said first carriage along a second axis perpendicular to said first axis,
said first mounting means comprising,
precision way means located at the center of said frame and first carriage, and ball bearing block means mounted at each side of said first carriage and said frame,
wherein said precision way mounting means for said first carriage comprises,
a set of precision ways mounted on said frame parallel to said precision ways,
a block having an inverted V-portion mounted on said first carriage,
said inverted V-portion riding on said balls, and
wherein said ball bearing block means comprises,
a set of rotatably mounted bearing blocks mounted on each side of said first carriage,
a bearing ball holder mounted on each side of said frame under said bearing blocks, each of said bearing ball holders being adapted to contain a row of bearing balls adapted to support said bearing blocks with minimum friction.

References Cited

UNITED STATES PATENTS

| | | | |
|---|---|---|---|
| 2,791,136 | 5/1957 | Smith | 77—64 |
| 2,838,967 | 6/1958 | Meyer | 77—63 |
| 2,880,632 | 4/1959 | Charlat | 77—64 |
| 3,076,682 | 2/1963 | Brault | 308—6 |
| 3,205,587 | 9/1965 | Kelburn | 33—189 |

WILLIAM D. MARTIN, JR., *Primary Examiner.*

LEONARD FORMAN, *Examiner.*